G. H. JOHNSTON.
CALIPERS.
APPLICATION FILED JAN. 15, 1919.

1,328,566.

Patented Jan. 20, 1920.
2 SHEETS—SHEET 1.

Inventor
G. H. Johnston

By Lacy & Lacy Attorneys

G. H. JOHNSTON.
CALIPERS.
APPLICATION FILED JAN. 15, 1919.
1,328,566.
Patented Jan. 20, 1920.
2 SHEETS—SHEET 2.
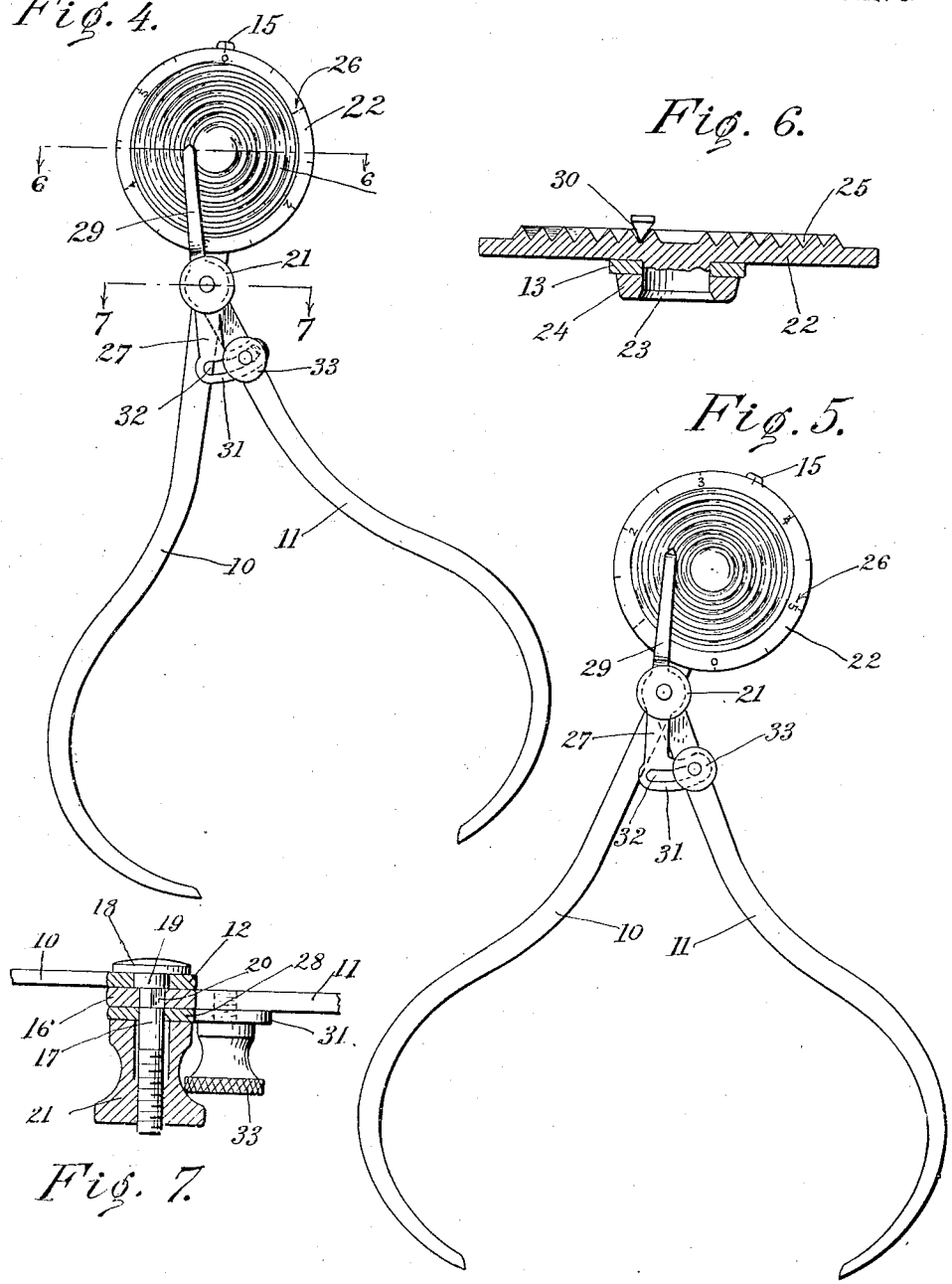
Inventor
G. H. Johnston
By Lacey & Lacey, Attorney

UNITED STATES PATENT OFFICE.

GEORGE H. JOHNSTON, OF APOLLO, PENNSYLVANIA.

CALIPERS.

1,328,566.

Specification of Letters Patent.

Patented Jan. 20, 1920.

Application filed January 15, 1919. Serial No. 271,262.

*To all whom it may concern:*

Be it known that I, GEORGE H. JOHNSTON, citizen of the United States, residing at Apollo, in the county of Armstrong and State of Pennsylvania, have invented certain new and useful Improvements in Calipers, of which the following is a specification.

This invention relates to an improved caliper and has as its primary object to provide a device of this character wherein the legs thereof may be freely swung to approximately adjusted position and wherein mechanical means will be provided for then accurately adjusting the legs with respect to each other.

The invention has as a further object to provide a caliper employing a rotatable adjusting disk which may be readily turned for accurately positioning the caliper legs with respect to each other.

A still further object of the invention is to provide a construction wherein the adjusting disk will be formed with a spiral cam groove and wherein a rock arm will be employed to ride at one end in said groove while the opposite end of said arm will be connected to one of the caliper legs so that when the disk is rotated said leg of the caliper will be swung with respect to the other leg thereof.

And the invention has as a still further object to provide a construction wherein the rock arm will be mounted upon a common pivot stud for the caliper legs and will have adjustable engagement with the leg to which it is connected so that the said leg may be swung free of the arm for initial positioning the legs with respect to each other when the arm may be rigidly connected with the leg for adjusting said leg with respect to the other leg of the caliper from the adjusting disk.

Other and incidental objects will appear during the course of the detailed description of the invention. In the drawings, wherein I have illustrated the preferred embodiment of the invention, and wherein similar reference characters designate corresponding parts throughout the several views.

Fig. 4 is a front elevation showing the manner in which one leg of the caliper may be freely adjusted with respect to the other leg thereof, Fig. 5 is a front elevation illustrating the manner in which the free leg of the caliper may be adjusted by means of the adjusting disk employed, Fig. 6 is a sectional view taken on the line 6—6 of Fig. 4 and looking in the direction of the arrows, this view showing, on a slightly enlarged scale, the adjusting disk in detail, and Fig. 7 is a transverse sectional view taken on the line 7—7 of Fig. 4 and looking in the direction of the arrows, this view showing, on a slightly enlarged scale, the mounting of the caliper legs.

Figure 2:
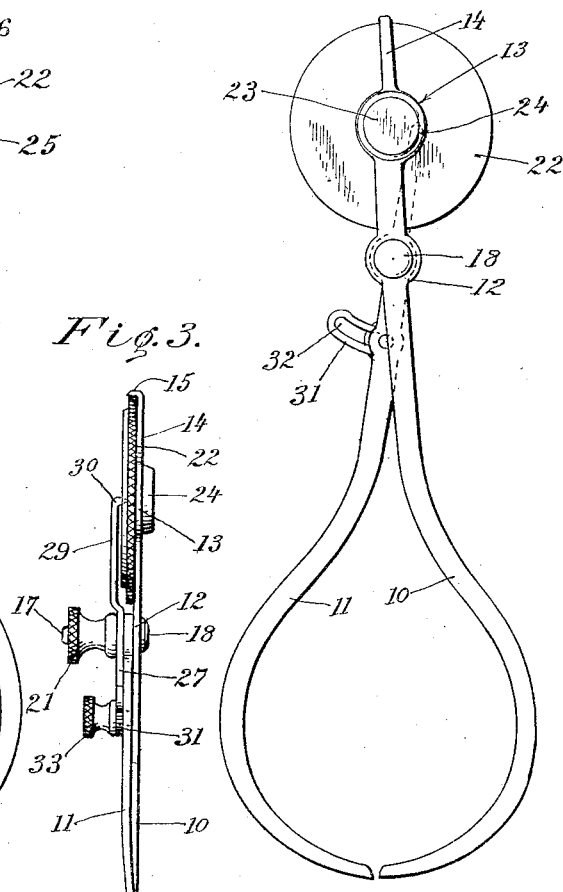
Fig. 2 is a rear elevation of the device.

In carrying the invention into effect I employ coacting caliper legs 10 and 11 respectively. The inner ends of the legs are straight while the outer ends thereof are curved toward each other, the caliper shown being designed for external measurements. However, as will appear as the description proceeds, the present invention may be embodied in calipers designed for internal measurements and I do not, therefore, wish to be limited in this regard. As particularly shown in Fig. 2 of the drawings, the leg 10 is somewhat longer than the leg 11, being formed adjacent its inner end with an enlargement 12 and at its inner terminal with a second enlargement 13 somewhat greater in diameter than the enlargement 12. From the enlargement 13 projects a longitudinally directed reduced pointer 14 extending axially of the leg in a plane therewith and formed at its outer end with a laterally and upwardly directed terminal 15. As also shown in Fig. 2, the pointer is preferably formed integral with the leg 10. At its inner end the leg 11 is, as shown in detail in Fig. 7, formed with an enlargement 16 seating upon the enlargement 12 of the leg 10 and formed centrally with a squared opening. Fitted through the enlargements 12 and 16 of the legs is a pivot stud 17. This stud is formed at its inner end with an annular head 18 seating against the outer face of the enlargement 12 of the leg 10 and formed on the stud at the inner side of the head is a slightly enlarged annular boss 19 journaled in a suitable opening in the said enlargement for supporting the stud to turn upon the leg. Above the boss 19 the stud is provided with a squared portion 20 snugly engaging within the squared opening in the enlargement 16 of the leg 11 so that this leg will thus be connected with the stud and swingingly supported thereby upon the leg 10. Threaded upon the outer extremity of the stud is a thumb nut 21 which is preferably provided with an enlarged milled head which may be readily grasped for adjusting the nut upon the stud to clamp the legs together.

Seated upon the enlargement 13 of the leg 11 and rotatable thereon, is an adjusting disk 22, the periphery of which is preferably milled so that the disk may be easily turned. Projecting from the lower side of the disk axially thereof is a trunnion 23 journaled through said enlargement to rotatably support the disk thereon and carrying a collar 24 at its lower end against which collar the trunnion is preferably overturned, as shown in detail in Fig. 6, for holding the disk against displacement. Formed on the upper side of the disk is a raised thread defining a spiral camway or groove 25 opening at its inner end at the center of the disk. The disk is further provided upon its upper face with a marginal scale 26, and, as will now be observed upon reference to Fig. 3 of the drawings, the terminal 15 of the pointer 14 is arranged to project upwardly at the periphery of the disk so that the graduations of the scale may be respectively brought into register with the pointer terminal by rotating the disk.

Figure 3:
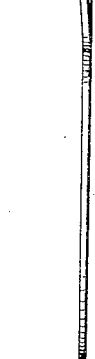
Fig. 3 is an edge elevation.

Mounted to swing upon the pivot stud 17 is a rock arm or lever 27. This arm is, as shown in detail in Fig. 7, provided intermediate of its ends with an enlargement 28 journaled upon the stud 17 beneath the thumb nut 21 to be held thereby seated upon the enlargement 16 of the leg 11 of the caliper. From the enlargement 28, the inner end portion of the arm is reduced to provide a finger 29 which, as shown in Fig. 3, is offset upwardly to extend over the raised cam thread of the disk 22 and is provided at its outer end with a depending beveled lug 30 adapted to ride within the cam groove 25 of the disk. At its inner end, the arm is formed with a laterally directed terminal 31 overhanging the leg 11 of the caliper and provided with a curved slot 32 concentric to the axis of the arm. Loosely engaging through this slot and threaded into the leg 11 is a thumb screw 33 provided with a somewhat enlarged milled head which may be readily grasped for adjusting the screw to clamp the terminal 31 therebeneath and thus rigidly connect the leg 11 with the arm.

Figure 1:
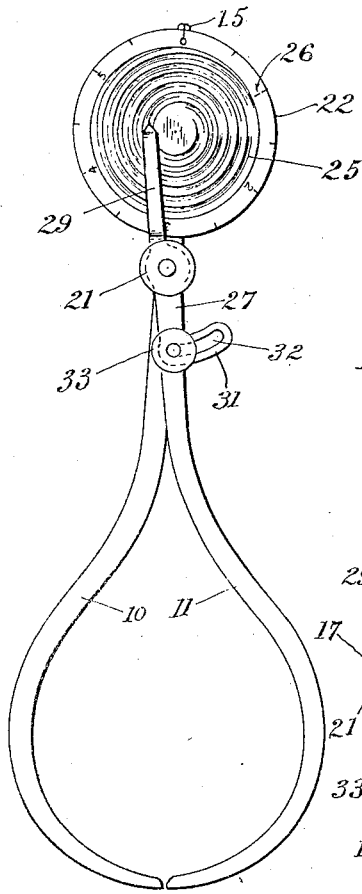
Figure 1 is a front elevation of my improved caliper.

In Fig. 1 of the drawings I have shown the normal position of the legs as well as the normal position of the rock arm 27 and adjusting disk 22. In using the device the thumb screw 33 is first loosened to free the leg 11 of the caliper from the rock arm. The leg 11 may then be freely swung upon the leg 10 and consequently moved to desired adjusted position with respect thereto. A preliminary rough adjustment of the caliper may thus be quickly obtained. When the leg 11 is thus swung with respect to the leg 10, the thumb screw 33 will, of course, move within the slot 32 of the terminal 31 of the arm 27 to permit such swinging of said leg and, after the leg has been initially positioned with respect to the leg 10, as just described, the thumb screw is then tightened for rigidly connecting the leg 11 with the rock arm. This done, the disk 22 may then be rotated in either one direction or the other, as found necessary, when the lug 30 of the finger 29 of the rock arm will ride within the cam groove 25 of the adjusting disk, to swing the leg 11 of the caliper in either one direction or the other, according to the direction of rotation of the disk, for accurately adjusting the leg 11 with respect to the leg 10. It will thus be seen that by employing the adjusting disk with its cam groove, the caliper legs may be mechanically adjusted with respect to each other with extreme accuracy, and, owing to the fact that the leg 11 may be initially adjusted freely, as previously described, loss of time, such as would be incident to accomplishing the whole adjusting operation by means of the adjusting disk, will be prevented. The scale 26 may, of course, have as many graduations as desired and will, in the practical use of the tool, serve to register any particular measurement to which the caliper legs may, by means of a standard scale, be adjusted. For instance, should the caliper legs be adjusted, in the manner indicated, to a distance of one inch apart and the graduation reading 5 on the disk 22 was then opposite the pointer 15, the same measurement could afterward be readily obtained by simply again turning the disk to bring the graduation five opposite the pointer. Assuming the caliper legs to be together, as shown in Fig. 1, and the disk in position to read zero on the scale, the graduations will then, as regards their spacing, be preferably coördinated with the movement of the disk and resultant adjustment of the caliper legs to properly indicate at the pointer, the adjustment of the legs.

Having thus described my invention, what is claimed as new is:

1. A caliper including swingingly connected legs, adjusting means rotatably mounted upon one of the legs and provided with a cam groove, and a rock arm pivoted at a point intermediate of its ends and operatively connected at one end portion with the other of the legs, the other end of the lever engaging in said groove whereby the latter leg may be adjustably positioned with respect to the first leg.

2. A caliper including swingingly connected legs, adjusting means rotatably mounted upon one of the legs and provided with a cam groove, a rock arm pivoted at a point intermediate of its ends and engaging at one end in said groove, and means for connecting the opposite end portion of said arm with the other leg whereby the latter leg may be adjustably moved with respect to the first leg by the said adjusting means.

3. A caliper including coacting legs, means swingingly connecting the said legs, adjusting means rotatable upon one of the legs, and a rock arm pivoted upon said first mentioned means, said rock arm being operatively connected at one end with the other leg and operatively engaging at its opposite end with said adjusting means whereby the latter leg may be adjustably positioned with respect to the first leg by the said adjusting means.

4. A caliper including swingingly connected legs, adjusting means rotatably mounted upon one of the legs, a rock arm pivoted at the pivotal axis of the legs and operatively engaging at one end portion with said adjusting means, a laterally directed terminal carried by the opposite end portion of the arm and overhanging the other leg, and means for connecting said terminal with the latter leg whereby the latter leg may be adjustably positioned with respect to the first leg by said adjusting means.

5. A caliper including coacting legs, a stud pivotally connecting said legs, and adjusting disk rotatably mounted upon one of the legs and provided with a cam groove, a rock arm pivoted upon said stud, said rock arm being provided at one end with a finger engaging said groove and at its opposite end with a laterally directed terminal overlying the other leg, and means for connecting said terminal with the latter leg whereby the latter leg may be adjustably positioned with respect to the first leg by rotating said disk.

6. A caliper including swingingly connected legs, adjusting means, and means pivotally supported at a point intermediate of its ends to coact at one end portion with said adjusting means and being connected at its opposite end portion with one of said legs whereby said leg may be adjusted with respect to the other leg.

7. A caliper including swingingly connected legs, adjusting means, means pivotally supported at a point intermediate of its ends to coact at one end portion with said adjusting means, and means for securing the opposite end portion of said first mentioned means to one of said legs whereby such leg may be adjusted with respect to the other leg.

8. A caliper including swingingly connected legs, adjusting means, and a rocker arm pivotally supported at a point intermediate of its ends to coact at one end portion with said adjusting means and being connected at its opposite end portion to one of said legs whereby such leg may be adjusted with respect to the other leg.

In testimony whereof I affix my signature.

GEO. H. JOHNSTON. [L. S.]